US009618243B2

(12) United States Patent
Burk et al.

(10) Patent No.: US 9,618,243 B2
(45) Date of Patent: Apr. 11, 2017

(54) ROTARY VALVE FOR AN ABSORPTION HEAT PUMP

(71) Applicant: Mahle Behr GmbH & Co. KG, Stuttgart (DE)

(72) Inventors: Roland Burk, Stuttgart (DE); Matthias Stripf, Karlsruhe (DE)

(73) Assignee: Mahle Behr GmbH & Co. KG (DE)

( * ) Notice: Subject to any disclaimer, the term of this patent is extended or adjusted under 35 U.S.C. 154(b) by 319 days.

(21) Appl. No.: 14/313,268

(22) Filed: Jun. 24, 2014

(65) Prior Publication Data

US 2014/0373948 A1    Dec. 25, 2014

(30) Foreign Application Priority Data

Jun. 24, 2013   (DE) .................. 10 2013 211 949

(51) Int. Cl.
*F25B 30/04*        (2006.01)
*F25B 41/04*        (2006.01)
(Continued)

(52) U.S. Cl.
CPC ............ *F25B 30/04* (2013.01); *F25B 17/083* (2013.01); *Y02B 30/62* (2013.01); *Y02B 30/64* (2013.01);
(Continued)

(58) Field of Classification Search
CPC ........ F25B 41/04; F25B 17/00; F25B 17/083; F25B 30/04; F16K 11/02; F16K 47/04;
(Continued)

(56) References Cited

U.S. PATENT DOCUMENTS 4,705,627 A  *  11/1987  Miwa ................. B01D 15/1842
                                                        137/625.46
5,059,228 A  *  10/1991  Cheng ..................... C09K 5/06
                                                        62/123
(Continued)

FOREIGN PATENT DOCUMENTS

CH            691744 A5      9/2001
DE       102008060698 A1     8/2009
(Continued)

OTHER PUBLICATIONS

English abstract for CH-691744.
German Search Report for Application No. 102014211703.8 dated Apr. 27, 2015.

*Primary Examiner* — Mohammad M Ali
(74) *Attorney, Agent, or Firm* — Fishman Stewart PLLC

(57) ABSTRACT

A rotary valve for an adsorption heat pump may include a cylindrical valve body, arranged rotatably about a central axis in a predetermined rotation direction with an outer covering and two front plates. A plurality of counter-directional high temperature connections may be arranged on the outer covering for connecting a high temperature heat source. A plurality of counter-directional medium temperature connections may be arranged on the outer covering for connecting a medium temperature heat sink. A plurality of sorption module connections may be arranged on the front plates for connecting a plurality of corresponding sorption modules. A duct system may pass through the valve body for directing a fluid, and a throttle, integrated into the valve body, may be included for constricting a flow cross-section at a throttle site of the duct system. The duct system may include open ducts and closed ducts.

18 Claims, 6 Drawing Sheets

(51) Int. Cl.
*F16K 11/02* (2006.01)
*F16K 47/04* (2006.01)
*F25B 17/00* (2006.01)
*F25B 17/08* (2006.01)

(52) U.S. Cl.
CPC ............... *Y10T 137/85986* (2015.04); *Y10T 137/86445* (2015.04); *Y10T 137/86654* (2015.04)

(58) Field of Classification Search
CPC ..... Y10T 137/86445; Y10T 137/86654; Y10T 137/85986; Y02B 30/64; Y02B 30/62
USPC ............ 62/476; 137/625.23, 624.12, 565.11, 137/624.18
See application file for complete search history.

(56) References Cited

U.S. PATENT DOCUMENTS

| | | | |
|---|---|---|---|
| 5,477,705 A | 12/1995 | Meunier | |
| 6,155,073 A * | 12/2000 | Gray | F25B 17/083 62/480 |
| 6,457,485 B2 * | 10/2002 | Hill | B01D 53/0446 137/240 |
| 7,819,948 B2 * | 10/2010 | Wagner | C01B 13/0259 137/616.7 |
| 2001/0045104 A1 * | 11/2001 | Bailey, Sr. | A43B 1/0054 62/510 |
| 2007/0026086 A1 * | 2/2007 | Boulis | A23J 1/20 424/535 |
| 2008/0034785 A1 * | 2/2008 | Yanagi | F25B 17/083 62/478 |
| 2009/0107332 A1 * | 4/2009 | Wagner | C01B 13/0259 95/100 |
| 2012/0090192 A1 * | 4/2012 | Oevreboe | F26B 5/06 34/285 |
| 2012/0279250 A1 | 11/2012 | Burk | |

FOREIGN PATENT DOCUMENTS

| | | |
|---|---|---|
| DE | 102010043539 | 5/2011 |
| WO | WO-2011/015648 A2 | 2/2011 |

* cited by examiner

ROTARY VALVE FOR AN ABSORPTION HEAT PUMP

CROSS-REFERENCE TO RELATED APPLICATIONS

This application claims priority to German Patent Application No. 10 2013 211 949.6 filed Jun. 24, 2013, the contents of which are hereby incorporated by reference in their entirety.

TECHNICAL FIELD

The invention relates to a rotary valve for an adsorption heat pump according to the introductory clause of the independent claim(s). The invention further relates to an adsorption heat pump with such a rotary valve.

BACKGROUND

A heat pump is understood to be any machine which receives thermal energy with the expenditure of mechanical or thermal energy from a reservoir with a lower temperature—for example the environment—, and together with the operating energy as useful heat transfers it to a system which is to be heated with a higher temperature—for instance for the purpose of space heating. This transfer takes place by way of the reversal of a heat and power process known from the prior art, in which thermal energy with a high temperature is received, is partially converted into mechanical effective work and the residual energy at a lower temperature is discharged as waste heat—typically to the environment. The principle of the heat pump can, for example in the case of a conventional refrigerator, also be used for cooling. In the cooling process, the useful energy is the heat received here from the space which is to be cooled, which together with the operating energy is discharged to the environment as waste heat. In the present context, the concept of the heat pump is therefore used in a wider sense and is not intended to comprise merely a heating unit based on the described principle, but equally a corresponding cooling machine.

Heat pumps are generally operated with fluids which vaporize at low pressure under the application of heat and condense again after compacting to a higher pressure under heat dissipation. The pressure is selected here so that the temperatures of the phase transition have a separation from the temperatures of heat source and heat sink which is sufficient for the heat transmission. Depending on the fluid which is used, this pressure lies in various ranges. In addition, sorption heat pumps are known from the prior art which, instead of technical work, use thermal energy as operating energy. Adsorption heat pumps operate here with a solid sorbent, the adsorbent, on which the cooling medium is adsorbed or desorbed. Heat is supplied to this process during the desorption, whereas heat is removed during the adsorption. As the adsorbent generally can not be circulated in a circuit, the process of the heat transmission is operated in a discontinuous manner in this case, by alternating cyclically between adsorption and desorption.

DE 10 2008 060 698 A1 and DE 10 2010 043 539 A1 disclose such a heat pump according to the adsorption principle with a plurality of hollow elements having respectively an adsorption agent, which hollow elements respectively contain a working medium which is transportable between the adsorption agent and a phase change region and are able to be flowed through by a heat-transporting fluid in a fluid circuit which is able to be altered by means of a valve arrangement. The said hollow elements are brought in thermal contact in the region of the adsorption agent through a specific sequence of valve arrangements, which are engaged in a periodic alternation, in order to offer a particularly wide range of application for the heat pump.

The rotary valves used for the cyclic impingement of the sorption modules nevertheless have some fundamental disadvantages. Such a disadvantage lies in the necessary coordination of the rotary valves to the number of sorption modules, which is determined by the type of construction. An output scaling of the installation by simple variation of the connected modules is therefore not possible without the use of a rotary valve which is respectively adapted exactly to the module number. For example, a rotary valve for six connected sorption modules can not be used for the controlling of eight sorption modules.

A further disadvantage lies in that the time for the decoupling of the sensible heat of each module on changing over between the heat carrier circuits of different temperature is coupled to the cycle time of the overall process. For this purpose, exactly calibrated throttles are provided, which define the respective partial flow for the decoupling of the sensible heats and supply into the complementary circuit, which can only be achieved for one cycle time.

This presents itself as a problem in particular in the optimization of the annual use efficiency, which is calculated exclusively from the performance factors (Coefficient of Performance, COP) of partial load states which are operated particularly frequently in the course of the year. Optimal COPs are, however, achieved with distinctly longer cycle times, which then also lengthen the time intervals for the regeneration phases in a detrimental manner.

SUMMARY

The present invention is therefore based on the problem of providing an optimized rotary valve for an adsorption heat pump, which can be adapted in its construction, with minimal effort, to adsorption heat pumps of differing construction type. The present invention is based, furthermore, on the problem of providing a corresponding adsorption heat pump which is able to achieve particularly high partial load efficiencies.

This problem is solved by a rotary valve and an adsorption heat pump having the features disclosed herein.

The invention is based on the general idea of providing in the duct system of a rotary valve, known per se, for an adsorption heat pump with a cylindrical valve body rotatably arranged in a predetermined rotation direction about a central axis, open ducts which open into a sorption module connection, and closed ducts which terminate in a front plate. The rotary valve has, furthermore, two counter-directional high temperature connections, arranged on the outer covering, for connecting a high temperature heat source, and two counter-directional medium temperature connections, arranged on the outer covering, for connecting a medium temperature heat sink. A plurality of sorption module connections, arranged on the front plates, are also provided for connecting sorption modules of the adsorption heat pump. Through the throttle provided according to the invention at a throttle site of the duct system, in particular high partial load efficiencies can be achieved.

A favourable possibility is provided by a first switch position, in which the fluid flows through the throttle site, and a second switch position, in which the fluid does not flow through the throttle site, wherein the rotary valve switches cyclically after a first time interval from the first switch position into the second switch position and after at least a second time interval from the second switch position back into the first switch position. Thereby, the relevant time for the recovery of sensible heat can be selected independently of a cycle time. Consequently, the efficiency can be further improved.

A further favourable possibility makes provision that the throttle is dimensioned so that in the first time interval a predetermined volume of the fluid flows through the throttle site. It can therefore be achieved that the fluid undergoes a great temperature change when it flows through one of the sorption modules.

A particularly favourable possibility makes provision that the duct system comprises the open and closed ducts in an identical number. Therefore, the first and the second switch position can occur with identical frequency.

A further particularly favourable possibility makes provision that the open and closed ducts are arranged in an alternating sequence. Thereby, the first switch position and the second switch position are switched alternately.

An advantageous solution provides apertures, arranged substantially at right-angles to the central axis, for connecting the duct system with the medium temperature connections and/or the high temperature connections. Consequently, the first switch position and the second switch position can be realized in a simple manner.

A particularly advantageous solution provides a first switch position, in which the fluid is directed from a feed of the high temperature heat source via at least one of the sorption modules and via the throttle site into a return of the medium temperature heat sink, and/or in which the fluid is directed from a feed of the medium temperature heat sink via at least one of the sorption modules and via a further throttle site into a return of the high temperature heat source, and a second switch position, in which the fluid is directed from a feed of the high temperature heat source via at least one of the sorption modules into a return of the high temperature heat source, and/or in which the fluid is directed from a feed of the medium temperature heat sink via at least one of the sorption modules into a return of the medium temperature heat sink. In this way, sensible heat, which on cooling of one of the sorption modules is received by the fluid, can be used by the fluid being delivered to the return of the high temperature heat source. Accordingly, fluid cooled on heating of one of the sorption modules can be delivered to the return of the medium temperature heat sink and consequently can likewise recover energy.

Through the throttle site, it can be achieved that the fluid heats up particularly intensively on cooling of one of the sorption modules, or cools down particularly intensively on heating of one of the sorption modules, so that the recovery of the sensible heat is particularly effective.

A further advantageous solution for the recovering of the sensible heat makes provision that the rotary valve switches cyclically after a first time interval from the first switch position into the second switch position, and after at least a second time interval switches from the second switch position into the first switch position. Consequently, the duration of the cooling- and heating phases, in which the sensible heat is recovered, can be coordinated independently of the remaining cycle time.

A further particularly advantageous solution makes provision that the throttle is dimensioned so that in the first time interval a predetermined volume of the fluid flows through the throttle site. Thereby, the flow rate of the fluid can be adjusted so that the fluid heats up or cools down particularly intensively, which is advantageous for the recovery of the sensible heat.

A favourable solution makes provision that at least a portion of the connected sorption modules are flowed through serially. Thereby, a greater spread can be achieved between feed temperature and return temperature.

A further favourable solution makes provision that the rotary valve has at least two axial ducts which connect respectively two sorption module connections, which are arranged offset in a rotation direction of the rotary valve. Thereby, a serial switching of at least two of the sorption modules is achieved.

A particularly favourable solution makes provision that the fluid, with a heating of the sorption modules, flows through the sorption modules in a direction which is opposed to the direction in which the fluid flows through the sorption modules with a cooling of the sorption modules. Through this counterflow arrangement, the direction of the temperature gradient within the sorption modules remains identical on cooling and on heating. Thereby, less heat is wasted.

Furthermore, the above-mentioned problem is solved by an adsorption heat pump with a rotary valve according to the above description. The advantages of the rotary valve are therefore transferred to the adsorption heat pump, to the above description of which reference is made in this respect.

Further important features and advantages of the invention will emerge from the subclaims, the drawings and the associated description of the figures with the aid of the drawings.

It shall be understood that the features mentioned above and to be further explained below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically

DETAILED DESCRIPTION

Figure 1:
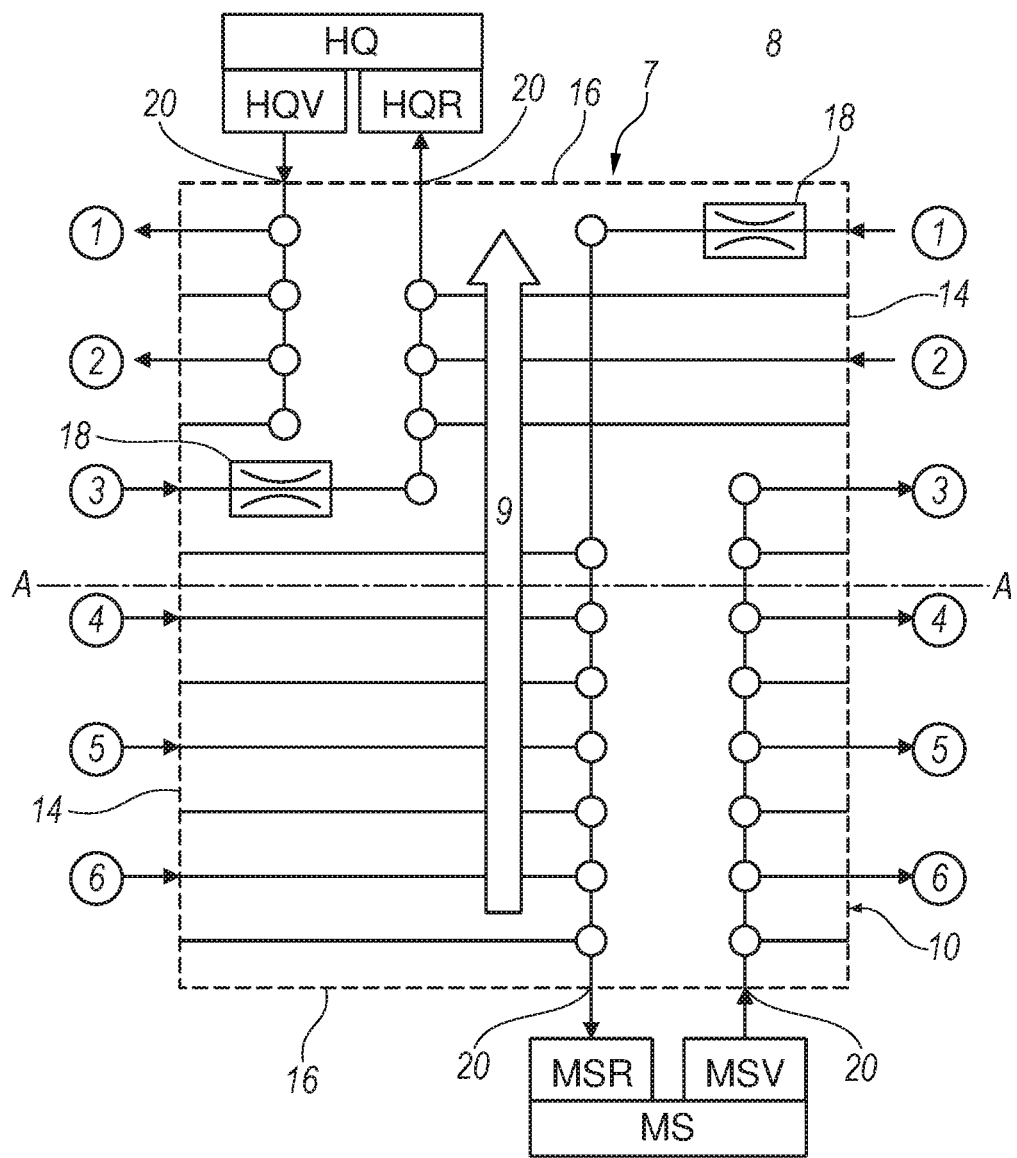
FIG. 1 a rotary valve for the cycling of the sorption zones of sorption modules of an adsorption heat pump according to a first embodiment of the invention in a first rotor position, FIG. 2 the rotary valve of FIG. 1 in a second, changed rotor position, FIG. 3 a rotary valve for the cycling of the sorption zones of sorption modules of an adsorption heat pump according to a second embodiment of the invention, FIG. 4 a rotary valve for the cycling of three sorption modules of an adsorption heat pump according to a third embodiment of the invention in a first rotor position, FIG. 5 the rotary valve of FIG. 4 in a subsequent second rotor position, FIG. 6 the rotary valve of FIG. 4 in a subsequent third rotor position, FIG. 7 the rotary valve of FIG. 4 in a subsequent fourth rotor position, FIG. 8 the rotary valve of FIG. 4 in a subsequent fifth rotor position, and FIG. 9 the rotary valve of FIG. 4 in a subsequent sixth rotor position.
Figure 2:
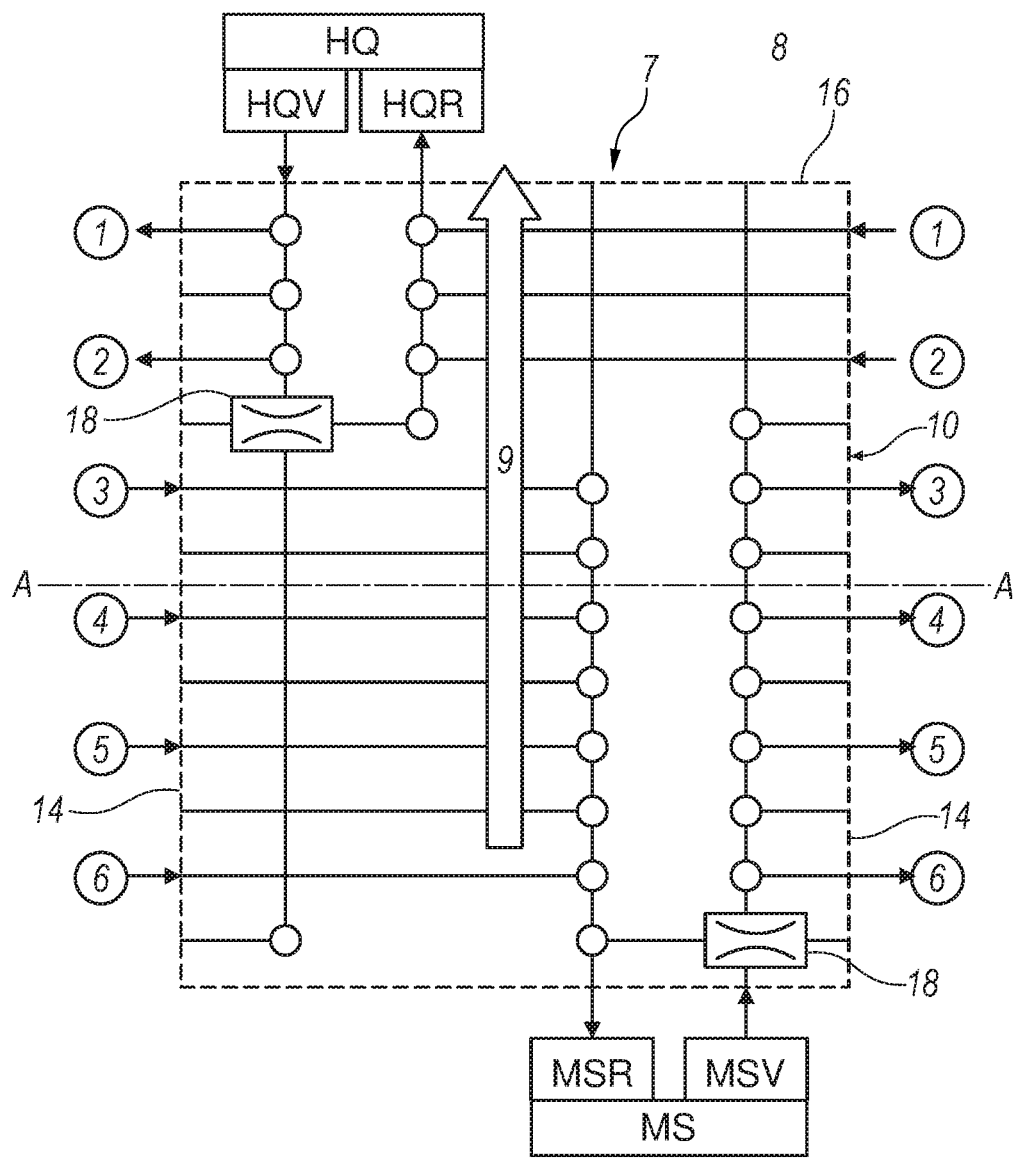

The approach according to the invention is explained with the aid of the embodiments of a rotary valve 7 illustrated in FIGS. 1 and 2. These illustrations present in abstract form the switch position of a generic rotary valve 7 with twelve axial ducts in the rotor and six connections for sorption modules 1-6.

The invention is based on the general idea of providing in the duct system of a rotary valve 7 for an adsorption heat pump 8 with a cylindrical valve body 10 rotatably arranged in a predetermined rotation direction 9 about a central axis A-A, open ducts which open into a sorption module connection, and closed ducts which terminate in a front plate 14. The rotary valve 7 has, furthermore, two counter-directional high temperature connections HQV, HQR, arranged on the outer covering 16, for connecting a high temperature heat source HQ, and two counter-directional medium temperature connections MSR, MSV, arranged on the outer covering 16, for connecting a medium temperature heat sink MS. A plurality of sorption module connections, arranged on the front plates 14, are also provided for connecting sorption modules 1-6 of the adsorption heat pump 8. Through the throttle 18 provided according to the invention at a throttle site of the duct system, in particular high partial load efficiencies can be achieved.

The figures show twelve axial ducts of the rotor with the radial apertures 20 to circumferential annular chambers, which are provided with radial connections for the feed HQV and the return HQR of a high temperature heat source HQ and the feed MSV and the return MSR of a medium temperature heat sink MS.

The axial ducts adjoin stationary front plates 14, in which only every other duct leads to respectively a sorption module 1-6. The ducts lying between in the rotor are closed by the front plates 14 and are therefore not flowed through.

FIG. 1 illustrates here a first rotor position, in which hot fluid flows from the feed HQV of the high temperature heat source HQ to the sorption modules 1 and 2. Via the opposite front plate 14, the fluid of the first sorption module 1 is delivered via a throttle 18, integrated in the rotor, to the return MSR of the medium temperature heat sink MS. The throttle side is dimensioned so that the partial flow can complete the temperature change from adsorption to desorption over the period of time for this switch position. Consequently, a majority of the sensible heat is recovered. This applies in a complementary manner to the third sorption module 3 which is to be cooled, which is cooled to the adsorption temperature on the feed side for the first time after the desorption phase. The fluid, which is heated intensively, is therefore delivered initially to return HQR of the high temperature heat source HQ.

Figure 3:
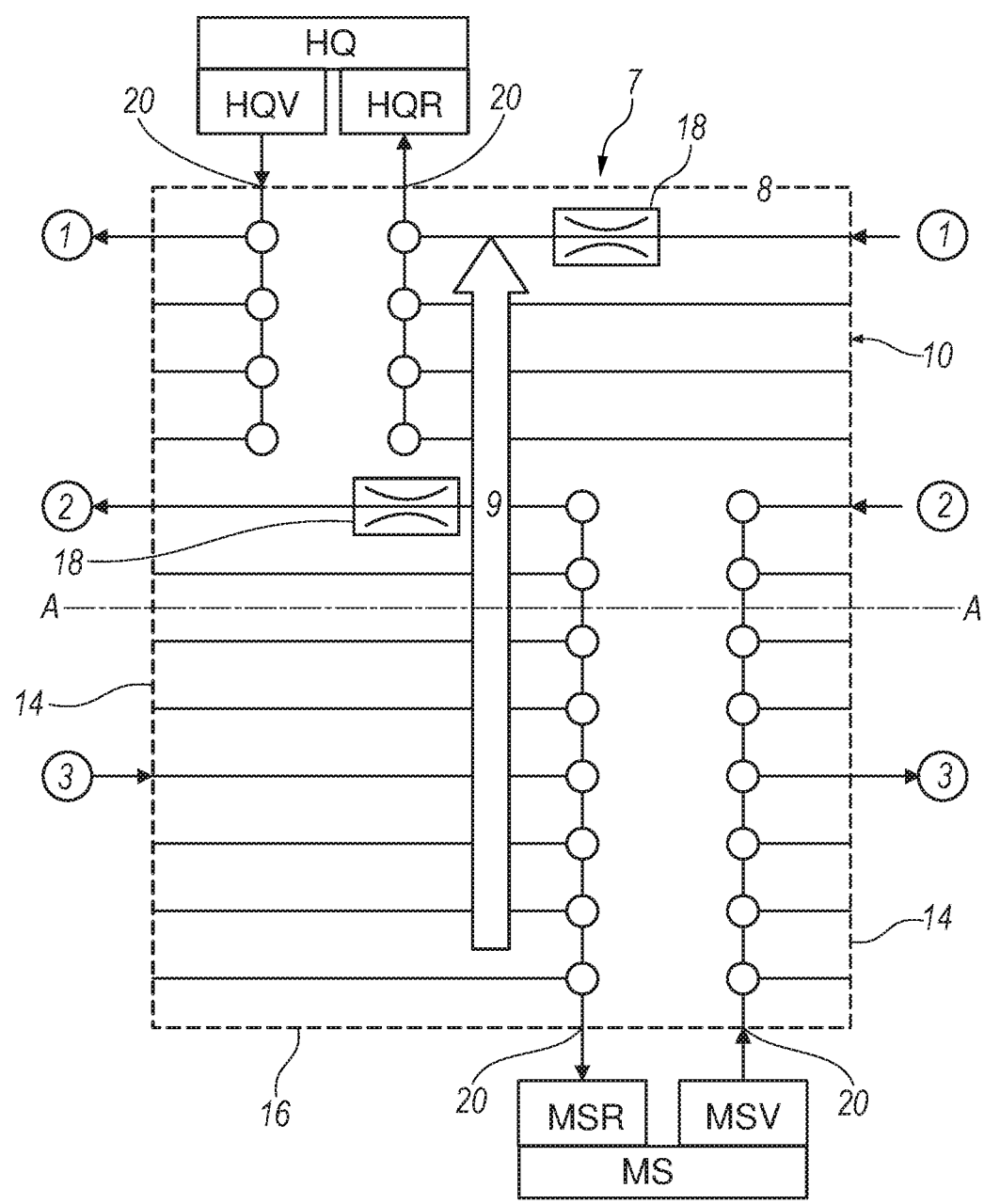
Figure 4:
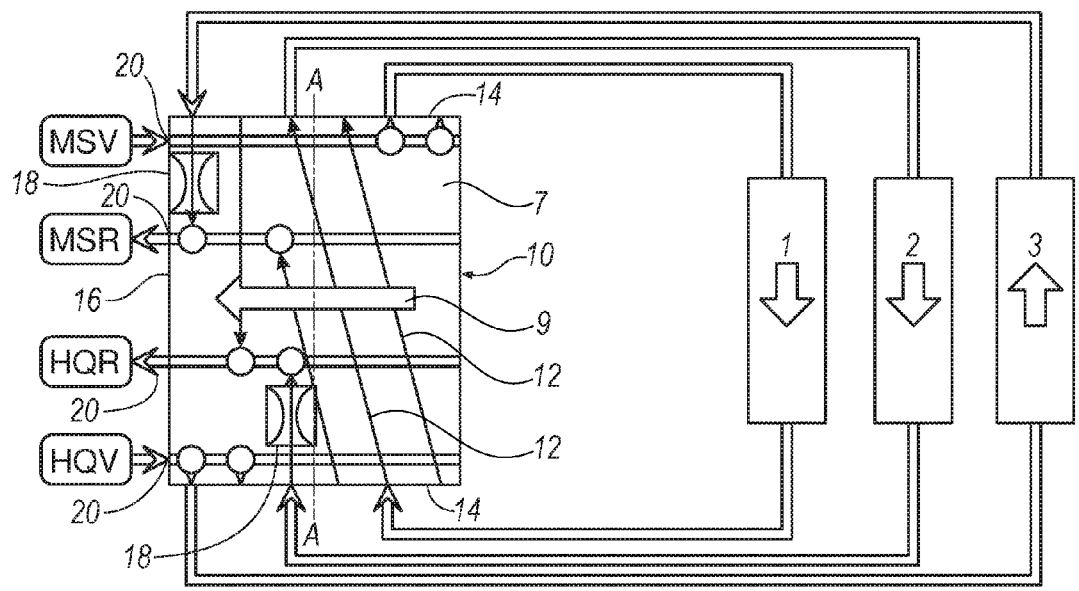
Figure 5:
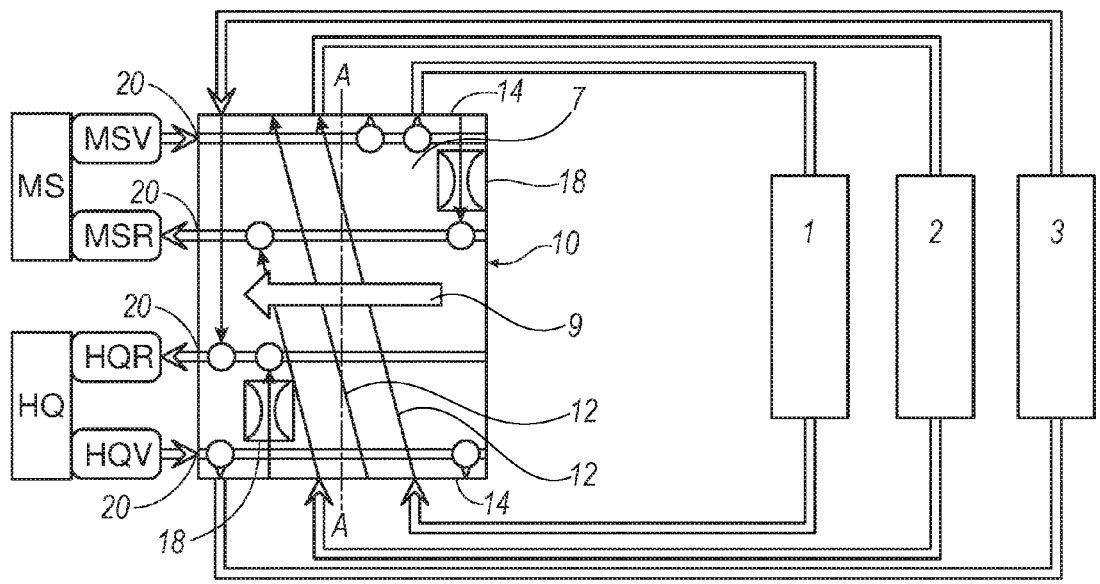
Figure 6:
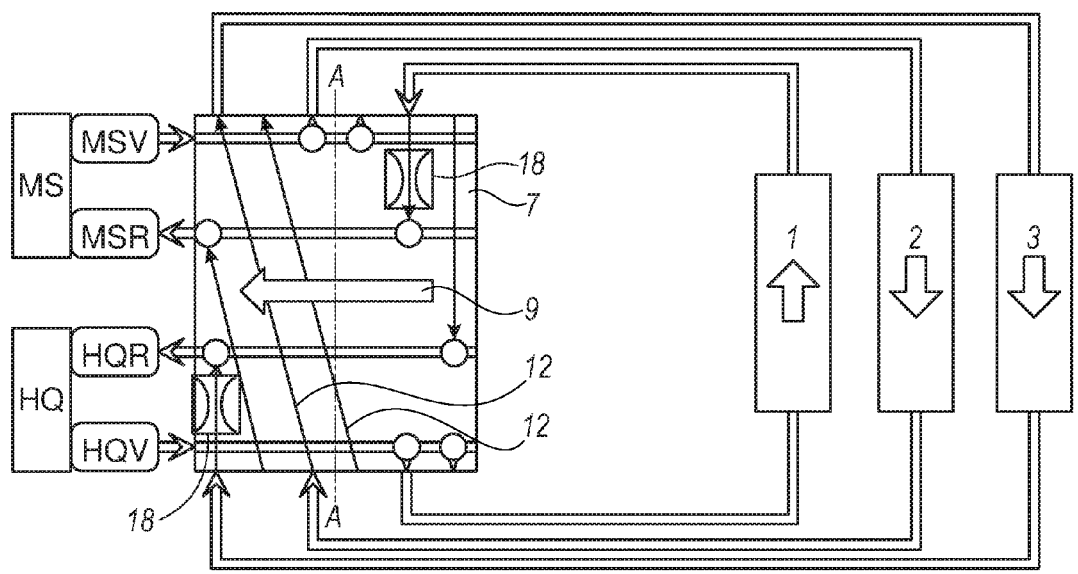
Figure 7:
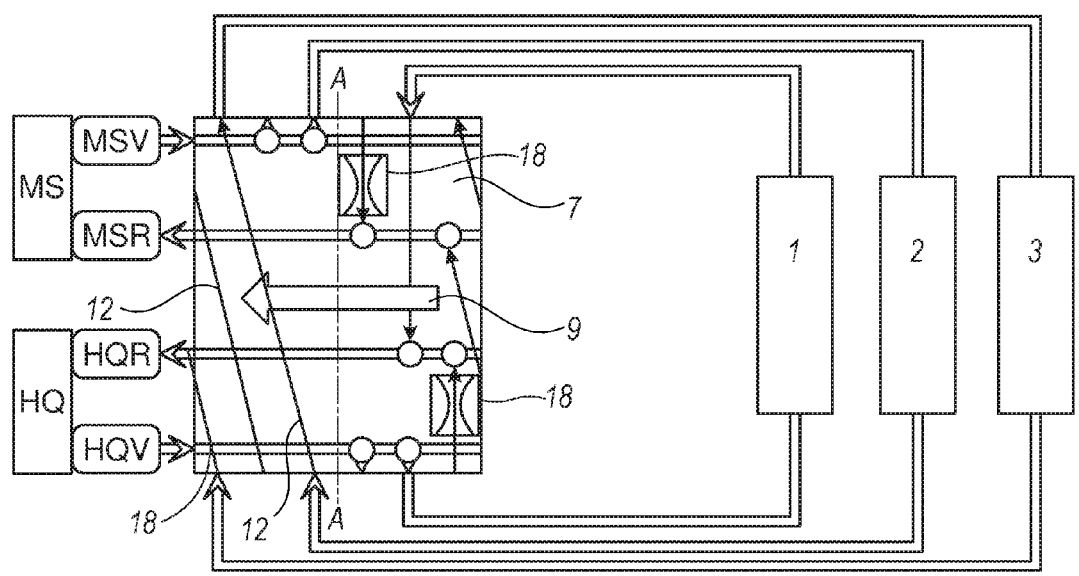
Figure 8:
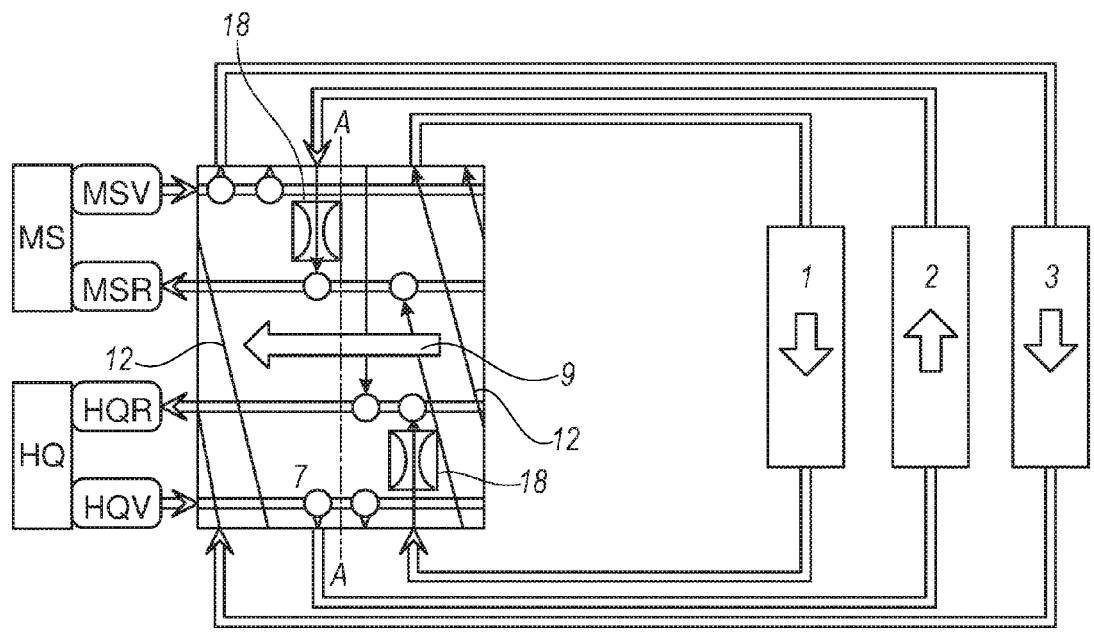
Figure 9:
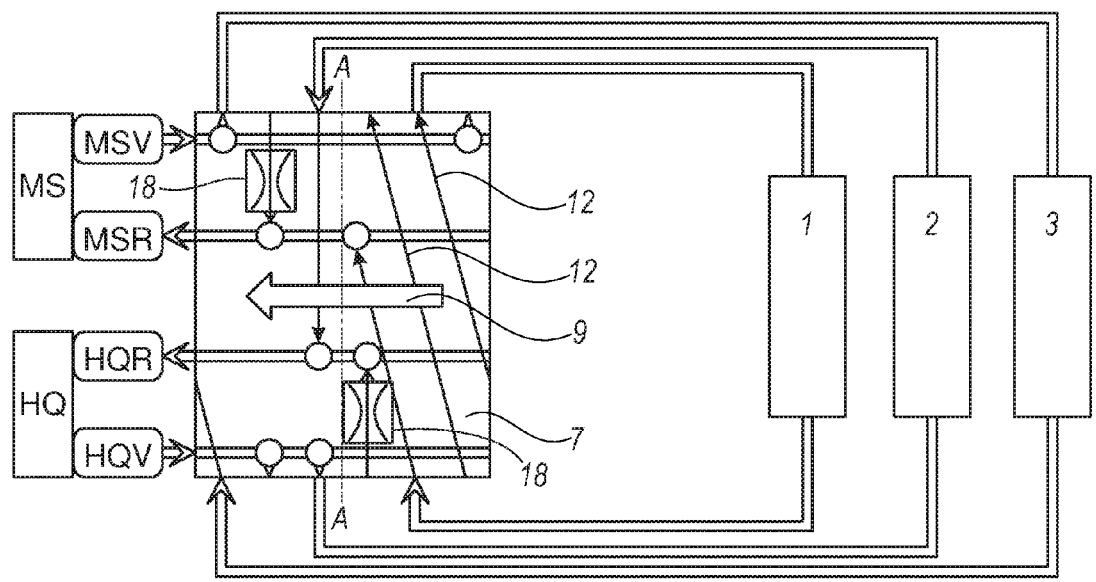

In the subsequent switching step according to FIG. 2, the returns of the first sorption module 1 and of the second sorption module 2 are delivered to the return HQR of the high temperature heat source HQ, whilst the further sorption modules 3-6 open into the return MSR of the medium temperature heat sink MS. In this switch position, the ducts of the rotor which are provided with throttles 18 are not flowed through. This opens up the advantageous possibility of a variation of the cycle time independently of the regeneration phases, by the even and the uneven time intervals being selected to be of different length. Thereby, a further increase in efficiency of the adsorption heat pump 8 is achieved particularly in partial load operating states, in which the fluid mass flows and transmission efficiencies are reduced in accordance with the degree of limitation, and the cycle times are extended in a correlated manner. The time intervals for the thermal regeneration phases can be optimized independently thereof A further advantage of this embodiment of the rotary valve 7 consists in that the module number can be reduced for example to three modules, by only the stationary front plates 14 being embodied with only three outlets in each case, as is illustrated in FIG. 3. In this case, four switching steps are necessary for a complete module change cycle, in which the first switching interval serves for heat regeneration and can be optimized chronologically largely independently of the other switching intervals.

As the switching intervals for the heat recovery phases can be selected flexibly independently of the regular switching times, the throttles 18 only have to be coordinated relative to one another for reducing the partial volume flows. The optimal decoupled sensible heats of the respective modules can then be controlled flexibly by the length of the corresponding switching interval. The fluid return temperature could be drawn upon as trigger signal for the end of the heat recovery phase. For this, it is proposed to terminate this switching interval when the return exceeds a mean value of the temperatures at the return HQR of the high temperature heat source HQ and at the return MSR of the medium temperature heat sink MS.

A third embodiment of the rotary valve 7 according to the invention, illustrated in FIGS. 4 to 9, differs from the example embodiment of the rotary valve 7 illustrated in FIGS. 1 and 2 in that the rotary valve 7 is provided for three connected sorption modules 1, 2 and 3, in that the rotor has six axial ducts, and in that the two sorption modules to be cooled respectively in the adsorption mode are switched serially from the feed MSV of the medium temperature heat sink MS to the return MSR of the medium temperature heat sink MS.

The rotor of the rotary valve 7 has several, for example two, ducts 12, which lead forward two switching steps respectively in relation to the rotor rotation direction 9. The ducts 12 therefore, in the axial traversing of the rotor, have an offset forward, so that in the first and the second rotor position, the return of the first sorption module 1 to be cooled in the adsorption mode is switched via the rotor to the feed of the next sorption module 2.

Accordingly, in the third and fourth rotor position, the sorption modules 2 and 3 and in the fifth and sixth rotor position the sorption modules 3 and 1 are switched.

The rotary valve has two switch positions. The first switch position corresponds to a cross switching and the second switch position corresponds to a regular switching. The first, third and fifth rotor position, i.e. the odd-numbered rotor positions, form respectively a cross switching, therefore correspond to the first switch position. The second, fourth and sixth rotor position, i.e. the even-numbered rotor positions, form respectively a regular switching, therefore correspond to the second switch position.

In the first rotor position, recooled fluid coming from the feed MSV of the medium temperature heat sink MS is delivered to the sorption module 1, which is thereby cooled to a low temperature. In so doing, the cooling fluid is heated. This is then delivered to the sorption module 2, which is still very hot after the desorption phase, whereby the fluid receives further heat. As the heat flow proportion of this sorption module 2 which is to be precooled has a very high sensible component, the fluid outlet temperature is so high that it is delivered advantageously to the return HQR of the high temperature heat source HQ via a throttle 18.

In a complementary manner thereto, the return of the sorption module 3 which is to be heated to desorption temperature is directed via a throttle 18 to the return MSR of the medium temperature heat sink MS. Via the incorporated throttles 18, the volume flows can be adapted reciprocally, and with consistent pump system pressures can be reduced in order to realize a high yield of recovered heat.

In this phase, the sorption modules 2 and 3 have a large chronological and local temperature gradient. For this reason, a holding time in the cross switching has a great influence on the amount of recovered sensible heat. If the holding time is too short, only a smaller portion of the sensible heat can be recovered. If the holding time is too long, heat is transported, unused, from the high temperature heat source HQ to the medium temperature heat sink MS.

The holding time of the first switch position with cross switching can now be selected according to the invention chronologically independently with respect to the cycle time of the process, so that a maximum of heat is recovered on change of temperature. This is possible in particular in that a changeover is made between the cross switching, as present in the rotor positions one, three and five, and a regular switching, as present in the rotor positions two, four and six.

In the second rotor position, which forms a second switch position with regular switching, the association of the sorption modules 1, 2 and 3 to the feeds HQV of the high temperature heat source HQ and MSV of the medium temperature heat sink MS and the serial switching logic of the sorption modules (1 and 2) which are to be cooled are unchanged to the first rotor positions. However, as the recoverable sensible heat is already largely decoupled, the returns are delivered to the correct heat carrier circuits.

The further FIGS. 6 to 9 complete the overall cycle, in which all modules are directed in a chronologically staggered manner through a heating, desorption, cooling and adsorption phase, wherein on switching through the rotor positions one to six, the first switch position with cross switching alternates with the second switch positions with regular switching.

Generally, the respective holding times in the first switch position with the cross switching of the rotary valve 7 are shorter than the holding times in the second switch position with regular switchings, and can be selected independently of one another by actuation only of a drive motor. In particular through an extension of the holding time in a second switch position with regular switching independently of the holding time in a first switch position with a cross switching, high partial load COPs can be achieved.

Of course, the basic principle of the serial module switching with "cross switching phases" can also be transferred to several sorption modules which are to be desorbed.

Furthermore, the rotary valve 7 has a countercurrent guidance of the sorption modules 1, 2 and 3. This means, in the cooling phase and in the heating phase, the sorption modules 1, 2 and 3 are flowed through in a contrary manner. Thereby, the temperature profiles on heating and cooling of the sorption modules 1, 2 and 3 remain in alignment. Consequently, one comes very close to the ideal of heat recovery by the "thermal wave" method, in which temperature ramps are moved without reversal of the temperature profile through the adsorber structures.

Moreover, the serial connection of several sorption modules 1, 2 and 3 enables a greater feed/return spread of the heat source- and heat sink circuits, which is desired or even required in many applications.

For the rest, the third embodiment of the rotary valve 7 illustrated in FIGS. 4 to 9 conforms to the first embodiment of the rotary valve 7 illustrated in FIGS. 1 and 2 with regard to structure and function, the above description of which is referred to in this respect.

The embodiments described hitherto related to the rotary valve 7 for the cycling of the sorption zones of sorption modules or for separate sorption reactors with external, central or decentral condenser and evaporator.

For the phase-specific fluid control of the phase change zones of several sorption modules, a further rotary valve is necessary, which is embodied in a basically analogous manner. The further rotary valve differs from the rotary valve 7 only in so far as the ducts provided with throttles can also be completely closed for realizing an adiabatic process change.

The invention claimed is:

1. A rotary valve for an adsorption heat pump, comprising:
   a cylindrical valve body, arranged rotatably about a central axis in a predetermined rotation direction with an outer covering and two front plates;
   a plurality of counter-directional high temperature connections arranged on the outer covering for connecting a high temperature heat source;
   a plurality of counter-directional medium temperature connections arranged on the outer covering for connecting a medium temperature heat sink;
   a plurality of sorption module connections arranged on the front plates for connecting a plurality of corresponding sorption modules;
   a duct system passing through the valve body for directing a fluid;
   a throttle, integrated into the valve body, for constricting a flow cross-section at a throttle site of the duct system, wherein the duct system includes open ducts, which open into a sorption module connection, and closed ducts, which at least one of terminate in and terminate at a front plate; and
   a first switch position, in which the fluid flows through the throttle site and a second switch position, in which the fluid does not flow through the throttle site, and cyclically switching (i) after a first time interval from the first switch position into the second switch position and (ii) after at least a second time interval from the second switch position back into the first switch position.

2. The rotary valve according to claim 1, wherein the throttle is dimensioned to include a predetermined volume of the fluid flowing through the throttle site in the first time interval.

3. The rotary valve according to claim 1, wherein the duct system includes the open and closed ducts in an identical number.

4. The rotary valve according to claim 3, wherein the open and closed ducts are arranged in an alternating sequence.

5. The rotary valve according to claim 1, further comprising apertures arranged substantially perpendicular to the central axis for connecting the duct system with at least one of the medium temperature connections and the high temperature connections.

6. The rotary valve according to claim 1, wherein the first switch position further includes at least one of (i) the fluid is directed from a feed of the high temperature heat source via at least one of the sorption modules and via the throttle site into a return of the medium temperature heat sink, and (ii) the fluid is directed from a feed of the medium temperature heat sink via at least one of the sorption modules and via a further throttle site into a return of the high temperature heat source; and the second switch position further includes at least one of (i) the fluid is directed from a feed of the high temperature heat source via at least one of the sorption modules into a return of the high temperature heat source and (ii) the fluid is directed from a feed of the medium temperature heat sink via at least one of the sorption modules into a return of the medium temperature heat sink.

7. The rotary valve according to claim 6, wherein cyclically switching from the first switch position into the second switch position after the first time interval and from the second switch position into the first switch position after at least the second time interval includes the first time interval having a different duration than the second time interval.

8. The rotary valve according to claim 7, wherein the throttle is dimensioned to include a predetermined volume of the fluid flowing through the throttle site in the first time interval.

9. The rotary valve according to claim 8, wherein the duct system includes the open and closed ducts in an identical number.

10. The rotary valve according to claim 9, wherein the open and closed ducts are arranged in an alternating sequence.

11. The rotary valve according to claim 1, wherein at least a portion of the connected sorption modules are flowed through serially.

12. The rotary valve according to claim 1, further comprising at least two axial ducts, which connect respectively two sorption module connections, the at least two axial ducts arranged offset in a rotation direction of the rotary valve.

13. The rotary valve according to claim 12, further comprising apertures, arranged substantially perpendicular to the central axis, for connecting the duct system with at least one of the medium temperature connections and the high temperature connections.

14. The rotary valve according to claim 1, wherein on a heating of the sorption modules, the fluid flows through the sorption modules in a direction which is opposed to the direction in which the fluid flows through the sorption modules on a cooling of the sorption modules.

15. An adsorption heat pump, comprising:
a plurality of sorption modules; and
a rotary valve, the rotary valve including:
  a valve body rotatably arranged about a central axis in a predetermined rotation direction, the valve body including an outer covering and at least two front plates;
  at least two counter-directional high temperature connections arranged on the outer covering for connecting a high temperature heat source;
  at least two counter-directional medium temperature connections arranged on the outer covering for connecting a medium temperature heat sink;
  a plurality of sorption module connections arranged on the front plates for connecting the plurality of sorption modules;
  a duct system passing through the valve body for directing a fluid;
  a throttle integrated into the valve body for constricting a flow cross-section at a throttle site of the duct system, wherein the duct system includes open ducts which open into a sorption module connection, and closed ducts which at least one of terminate in and terminate at a front plate; and
  a first switch position, in which at least one of (i) a fluid is directed from a feed of the high temperature heat source via at least one of the sorption modules and via the throttle site into a return of the medium temperature heat sink, and (ii) the fluid is directed from a feed of the medium temperature heat sink via at least one of the sorption modules and via a further throttle site into a return of the high temperature heat source.

16. The pump according to claim 15, further comprising a second switch position, in which at least one of (i) the fluid is directed from a feed of the high temperature heat source via at least one of the sorption modules into a return of the high temperature heat source, and (ii) the fluid is directed from a feed of the medium temperature heat sink via at least one of the sorption modules into a return of the medium temperature heat sink.

17. The pump according to claim 16, further comprising cyclically switching after a first time interval from the first switch position into the second switch position, and after at least a second time interval from the second switch position into the first switch position, wherein the throttle is configured to allow a predetermined volume of fluid to flow through the throttle site in the first time interval.

18. A rotary valve for an adsorption heat pump, comprising:
a cylindrical valve body rotatably arranged about a central axis in a predetermined rotational direction, the valve body having an outer covering and at least two front plates;
at least two counter-directional high temperature connections arranged on the outer covering for connecting a high temperature heat source;
at least two counter-directional medium temperature connections arranged on the outer covering for connecting a medium temperature heat sink;
a plurality of sorption module connections arranged on the front plates for connecting a plurality of corresponding sorption modules;
a duct system passing through the valve body for directing a fluid; and
a throttle integrated into the valve body for constricting a flow cross-section at a throttle site of the duct system, wherein the duct system includes open ducts which open into a sorption module connection and closed ducts which at least one of terminate in and terminate at a front plate, the number of open ducts being equal to the number of closed ducts;
wherein the throttle includes a first switch position, in which the fluid flows through the throttle site, and a second switch position, in which the fluid does not flow through the throttle site, the throttle cyclically switching from the first position to the second position after a first time interval, and from the second switch position back to the first switch position after at least a second time interval, the throttle configured to allow a predetermine volume of fluid to flow through the throttle site in the first time interval.

* * * * *